United States Patent [19]
Brewer

[11] 3,814,336
[45] June 4, 1974

[54] HYDROPULPER AND CLASSIFIER EQUIPMENT

[75] Inventor: John C. Brewer, Salt Lake City, Utah

[73] Assignee: Garbalizer Corporation of America, Salt Lake City, Utah

[22] Filed: June 14, 1972

[21] Appl. No.: 262,922

[52] U.S. Cl............. 241/79.1, 241/46 R, 241/46.17
[51] Int. Cl............................................. B02c 13/10
[58] Field of Search............. 241/68, 79, 79.1, 79.2, 241/79.3, 76, 46, 46.11, 46.17

[56] References Cited
UNITED STATES PATENTS
2,635,104  4/1953  Chayen.................... 241/79.1 X
3,680,796  8/1972  Galeano.................... 241/79.1 X Primary Examiner—Roy Lake
Assistant Examiner—E. F. Desmond

[57] ABSTRACT

A hydropulper having spiral structure for feeding into a pulping region and also for classifying, with the use of a self-contained revolving rake structure, primary materials found in household garbage and municipal waste. A vibrating screen structure is used in connection with the rake for separating water and pulp contained therein from floatables such as plastics, rubber and wood. Non-ferrous metals, rock, sand, glass, and so forth, are conveyed upwardly, underneath and past a rake area partition means, so as to be deposited onto conveyor structure. The input pulping mechanism is constructed for ease of revolving drum pulper structure removal, cleaning and maintenance. Valve means control water level for a variety of purposes. The rake structure is preferably inclined and also cam or otherwise elevated proximate the discharge region.

9 Claims, 7 Drawing Figures

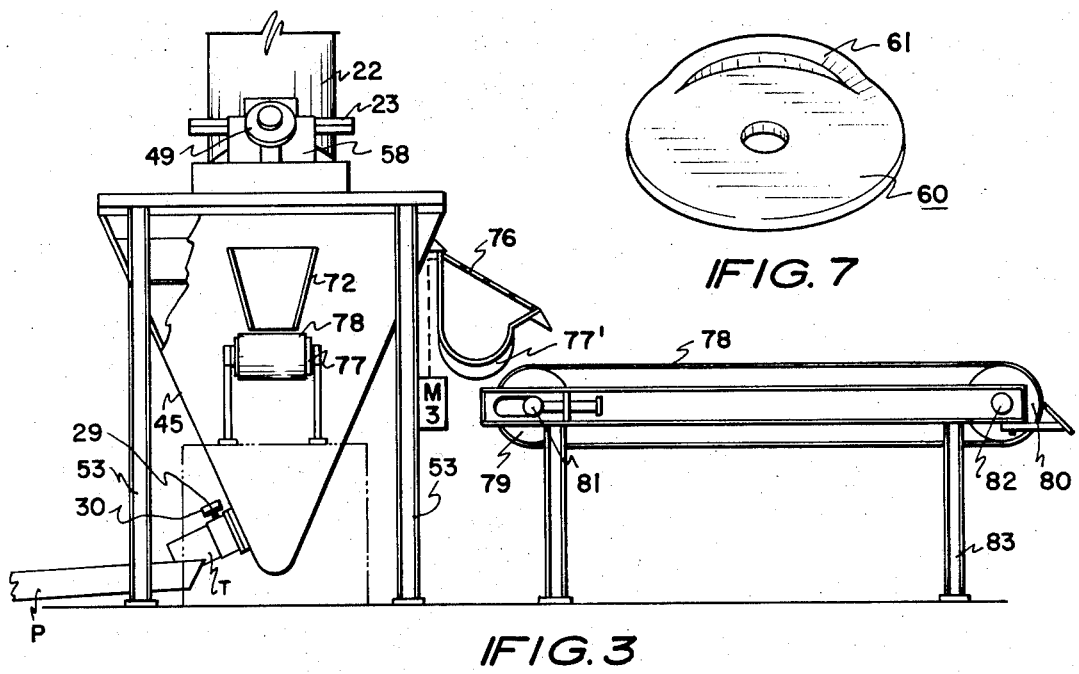
FIG. 7
FIG. 3
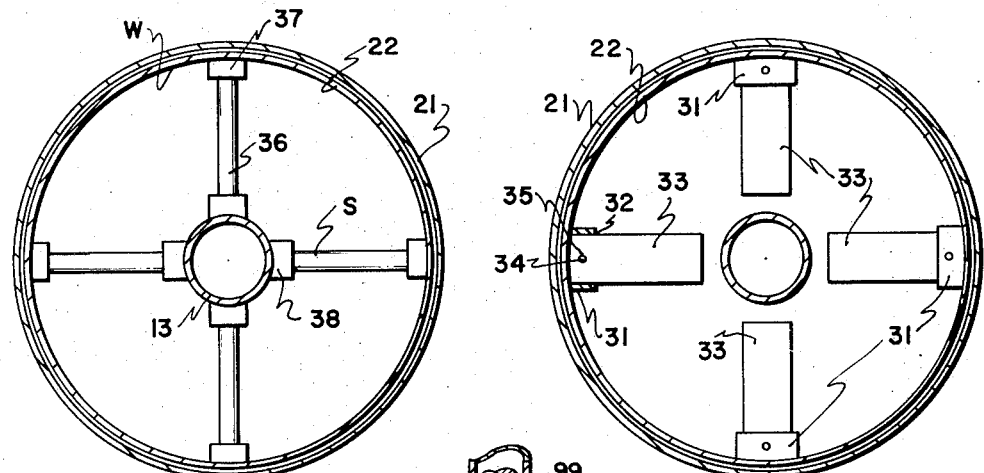
FIG. 5
FIG. 4
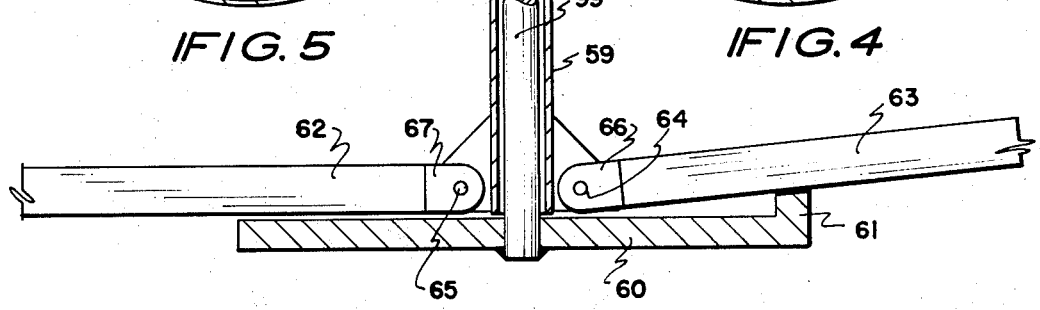
FIG. 6

HYDROPULPER AND CLASSIFIER EQUIPMENT

The present invention relates to pulping and classifying structures and, more particularly, to a new type of structure which the inventor prefers to refer to as a spiralled hydropulper.

In the present invention there is provided a tank having adjustable water level means. Disposed proximate the top of the tank is certain rake structure which operates, in conjunction with tank partition means and outlet means, to urge materials collecting at the top of the tank outwardly through a desired and provided outlet. The bottom of the tank is provided with an ascending auger or spiral that is constructed to lift, by its convolutions, solid materials such as rock, sand, glass and dirt, upwardly and out a portion of the tank that is partitioned off, by said partition means, from the rake structure within the tank.

The said tank is provided with a hopper input designed to receive shredded materials and also with a revolving drum structure serving as a pulper and connecting the hopper to the tank. The revolving drum is canted or inclined, is provided with suitable sealing structure, and itself receives and enjoys the same water level as that provided the tank structure.

Pulped materials and other floatables such as wood, rubber and plastics, are swept out the outlet of the tank by the rake structure employed and pass into a vibrating screen or vibrating grate area for separation of the water phase and pulp from the large floatables such as rubber, plastics and wood. Accordingly, the structure achieves a separation of organics such as garbage, food materials and paper products, from floatables such as rubber, wood and plastics, and also from inorganic substances such as rock, glass, dirt, sand and non-ferrous metals. In a preferred form of the invention the ferrous metals are previously removed from the incoming municipal waste and garbage materials, either before or after shredding, as by magnetic separation. Gate valve means is supplied the tank structure so that when the density of pulp material within the tank exceeds a predetermined desired maximum value, a portion of the water from the tank and pulp suspended therein may be routed with the materials passing through the vibrating screen, with new or fresh or recycled water being introduced into the tank so as to lower the density of pulp therein.

Accordingly, the principal object of the present invention is to provide an inexpensive structure for achieving a maximum separation of the primary materials found in household garbage and municipal waste.

A further object of the invention is to provide in a single structure rake means, in combination with an ascending spiral or auger, for carrying inorganics underneath and past the rake zone to desired conveyor structure.

A further object is to provide a hydropulper having incoming feed structure designed for efficiently pulping incoming fibrous materials, paper products and household garbage.

A further object of the invention is to provide a combination structure including pulping structure, rake structure, and ascending auger classifier structure for achieving a separation of prime materials of household garbage and municipal waste, and this preferably in conjunction with the means of a vibrating screen for achieving a separation of pulp material with its water stream from floatables such as wood, plastics, and rubber.

An additional object of the invention is to provide in classifying structure a revolving drum type pulping structure which may be easily withdrawn and maintained by operating personnel.

An additional object is to provide in a classifying system a rake structure that is cam or otherwise operated in a manner so as to lift upwardly materials carried proximate the water level surface to the relatively narrow depth outlet opening of the tank.

The features of the present invention may best be understood by reference to the following description taken in connection with the accompanying drawings in which:

FIG. 3 is an end view taken along the line 3—3 in FIG. 1.

FIG. 4 is a transverse cross section taken along the line 4—4 in FIG. 1.

FIG. 5 is a transverse cross section taken along the line 5—5 in FIG. 1.

FIG. 6 is an enlarged fragmentary view, partially in section, of representative rake structure that can be used in practicing the invention.

FIG. 7 is a perspective view of a cam plate usable in conjunction with the rake structure employed.

Figures 1, 2:
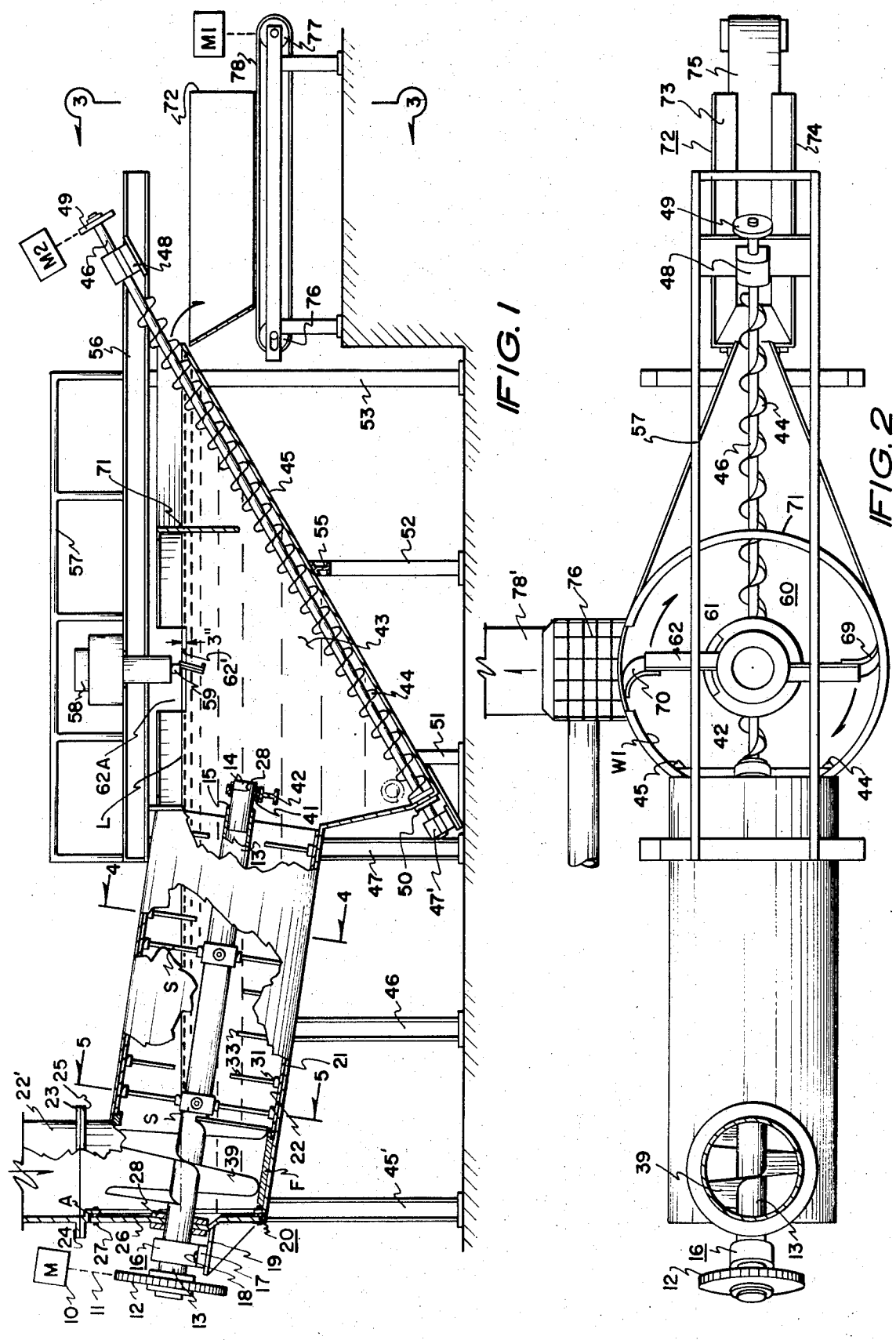
FIG. 1 is a side elevation, principally in section, of the spiralled classifier structure contemplated in a preferred embodiment of the present invention, minus rake cam.
FIG. 2 is a plan view of the structure of FIG. 1, illustrating rake positioning and movement and also the positioning of the ascending auger disposed within the rake tank.

In FIG. 1 a motor 10, shown in schematic view, is coupled, by any conventional means such as a V-belt 11, to the drive or coupling unit 12. Coupling unit 12 is fixedly mounted to a revolvable shaft 13 that, in the present form of the invention, takes the form simply of a hollow pipe. This is illustrated at the right-hand portion of shaft 13 where the same is shown to include a solid steel bar or shaft 14 that is welded at 15 to the interior of the principal shaft. Bearing 16 is a water-proof pillow-block type bearing that has a flange 17 mounted by suitable attachments 18 to a support bracket 19. The latter is welded or otherwise secured to housing structure 20. The latter, in part, comprises a shell housing 21 of cylindrical form within which a revolving shell 22 is disposed. Thus, revolving shell 22 revolves within shell housing 21 and is physically dimensioned therefrom approximately one-fourth of an inch between the shells. Hopper section 22' includes flange 23 which is bolted by suitable attachments 24 to the flange 25 of the aforementioned housing 20. Housing 20 includes a front plate 26 that is bolted by suitable attachments 27 to the remainder of the structure. The front plate will include water-proof sealing means such as a gasket, a packing gland, or other suitable means, as at A, so there will be no leakage between the housing and the front plate attachment. A packing gland or water-type seal as at 28 surrounds the shaft 13 and will be designed to prevent water leakage through the seal and through the front plate 26. In any event, it will be observed that the release of attachments 27 will cause a disassociation of the front plate from the housing so that the entire shaft and revolving shell unit 22 and all structure mounted thereon may be easily removed from the interior of fixed shell structure 21. When the front plate is removed from the principal housing structure by the removal of attachments 27, then the entire shaft and all equipment mounted thereon, including the revolving shell 22, will be removed from the shell housing 21. This will be facilitated, of course, by a loosening of bearing 28 relative to stub shaft extension 14 of shaft 13.

Preliminary, of course, to removal of the revolving shell as above described, there will be a lowering of the water level through the turning on of drain gate valve 30 in FIG. 3.

Gate valve 30 in FIG. 3 is inserted in the drain 29 to effect such drain and the lowering of the water level beneath level L in FIG. 1.

As to the equipment mounted upon revolving shaft 13, reference is now made to FIGS. 4 and 5. In FIG. 4 it is seen that the inner, revolving shell 22 is provided with a series of slot-type mounts 31 having recesses 32 for receiving pulping plates 33. The latter is secured in place by positioning pins 34 proceeding through corresponding apertures 25 of the individual plates and their slotted mounts 31. It is noted that, preferably, the pulping plates will be disposed in quadrature and will be radially aligned relative to radial direction from the revolving shaft 13. The primary purpose of the pulping plates will be to reduce to suspended pulp, organic materials such as foodstuffs and paper products.

Disposed upon the revolving shaft 13, see FIG. 5, are a series of spider structures S which include radial braces 36 having bosses 37 welded to the inner wall W of revolving shell 22. Inner bosses 38 are, in turn, welded to the shaft 13. The purpose, of course, for the spider structures S as indicated, see also FIG. 1, is to retain the shaft on center line relative to the axis of the inner shell and, additionally, to keep such inner shell in an exact cylindrical condition. It is noted that these spider structures are mutually spaced apart, see FIG. 1, and include intermediately disposed therebetween the series of pulping plates previously described.

That portion of the shaft 13 disposed underneath hopper 22 is provided with a spiral-shaped steel plate 39 taking somewhat the configuration of an auger blade. This auger blade structure at 39 assists and, in fact, directs the gradual propelling of incoming shredded garbage through the revolving shell 22.

The end bearing 28 will be a water-seal type bearing of which many are currently manufactured, and will be mounted as by suitable bolt means 41 to a beam 42. The beam 42 will be disposed transversely across and through tank portion 43 and will be welded to the interior wall W1 thereof at regions 44 and 45, see FIG. 2. These regions may be provided with brackets or other suitable support structure. In any event, the beam 42 will beheld rigidly by the tank portion and hence will provide sure support for the bearing 28 and, at the same time, will allow pulp and other materials to proceed downwardly within the revolving shell 22 and out the tank end thereof underneath beam 42. Thus, there is no interference by the beam with the input of the garbage into the tank portion of the structure.

It is noted, thus, that incoming material that has been pulped, as to the organic pulp portions, will float on top or near the top of the water, whereas metals, such as non-ferrous metals, glass, rock, sand, and so forth, will be carried downwardly by virtue of gravity over lip 61' so as to proceed in the area proximate auger 44. Post structures 45', 46 and 47 may be provided and welded at their upper extremities to the outer shell housing 21 to provide additional rigidity to the structure.

Tank portion 43 is configured to have a lower trough 45 for receiving the auger 44. Auger 44 includes a central shaft 46 which is journaled in external bearings 47 and 48 and which includes a conventional drive sprocket 49. A water-tight seal and a bearing structure at 50 of conventional design may likewise be provided. Post structures 51, 52 and 53 support tank portion 43 and also the structure disposed thereabove as hereinafter explained.

While the post 52 may itself support an I-beam 55 and the latter in turn support the tank portion 43, post 53 may rise on opposite sides of the tank and support not only the tank portion but also the drive unit support structure 56. The latter includes a hand rail 57 and, importantly, a central drive unit 58 fixedly secured relative thereto.

Control unit 58 comprises a motor having an output hollow revolving shaft 59 and also a fixed inner shaft 99 to which cam plate 60 is bolted or welded as shown. The cam plate includes a raised portion or cam portion 61 which is oriented in the direction of the outlet 62 in FIG. 1. Cam plate 60 may be directly bolted or welded to the end of the shaft 99. The cam portion 61 will be designed such that the opposite rakes 62 and 63, pivoted by pin means 64 and 65 to shaft bracket 66 and 67, will not come all the way out of the water and over the water level L. Rather, the rakes 62 and 63 will raise sufficiently to sweepingly discharge floatable solids such as plastics, rubber and wood, in addition to pulp, which are all carried essentially at the water level, proximate outlet 62.

To recapitulate, the tank portion 43 includes outlet 62A, the lower edge of which at 62' will be approximately three inches, by way of example, below the water level at L. Accordingly, the pair of rakes 62 and 63 will sweep about in an angulated scooping manner, see FIG. 1, and, upon reaching the raised portion 61 of cam plate 60, will be raised as at the ends of the rakes sweep past the discharge opening or outlet 62A. The raising of the rake end by the cam plate will cause the rake to tend to sweep the floatable out upwardly over base 62' of the opening. By way of example, when the end of the rake sweeps past the discharge opening 62A, perhaps four-fifths of the rake end will be disposed above the water level. During the other sector of travel, i.e. at other areas other than the discharge opening, a majority of the rakes will be positioned beneath the water level L. Accordingly, the flow of water through the system may be restricted by virtue of the small distance, e.g. 3 inches, between the water level L and overflow lip 62', see FIG. 1.

FIG. 2 illustrates that the rakes 62 and 63 may be provided with flexible end portions 69 and 70 that can be made from hard rubber and attached by conventional attachments to the ends of the rakes. These flexible ends tend to accomplish a flowing action at the discharge opening in addition to a scraping action about the interior of the tank portion. In the latter regard, an arcuate depending side portion 71 may be welded to the tank structure, see FIG. 2, so that a generally cylindrical rake path is provided. Portion 71 serves as a partition to prevent floatables from proceeding to the right of the same in FIG. 1. Accordingly, the floatables are constrained to the area of the revolving rakes, and will not be discharged to the area of the non-floatables as carried upwardly by auger 44. It is interesting to note at this point that there is effected an immediate separation of floatables and non-floatables by virtue of partition 71.

The non-floatables are carried upwardly by auger 44, and they will travel underneath partition 71; a hopper 72 receives the discharge of auger 44 and is formed simply of a pair of sloping sides 73 and 74 disposed over the conveyor belt 75. The latter will be operated as a conventional endless belt conveyor having end rollers 76 and 77, the latter being driven by motor M1. The purpose of the hopper comprising sides 73 and 74 is simply to direct the non-floatables downwardly into a more or less central position over the conveyor belt 75.

Motor M3, sloping FIG. 3, may be mounted to one of the supports and, by the usual eccentric, drives a vibrating screen 76. Motor and vibrating screen units are standard shelf items and need not be explained further. Vibrating screen 76 is disposed over a downwardly sloping trough 77. Thus, pulp and other organic floatables as proceed out of discharge opening 72A proceed with the water stream carrying the same, to the vibrating screen 76. Accordingly, the pulp matter in the water proceeds through the screen 76 and into the downwardly-sloped trough 77 for gravity feed to further processing. However, other floatable materials such as wood, rubber, plastics, and so forth, will not pass through the screen 76 but rather will vibrate downwardly for deposit onto endless conveyor 78'.

Endless conveyor 78 is supported by end rollers 79 and 80 which are carried by the customary shafts 81 and 82 on endless conveyor structure 83. The particular design of the conveyor is of no consequence and may be standard equipment.

What is essential is that at the vibrating screen area, namely vibrating screen 76, there is a separation of pulp matter and the water screen carrying the same from other floatables that are too large to pass through the vibrating screen. These remaining floatables as deposited upon conveyor 78 are routed for further processing, salvage or disposal.

To recapitulate as to operation, in essence what is achieved is a hydropulper system for processing solid, municipal waste, including household garbage. It must be emphasized at this point that the present structure comprises a spiraled, hydropulper. In the past there have been spiral classifiers and general hydropulpers, but it is felt that this is the first time that a spiraled hydropulper having a direct separation of materials featured, is presented in the art. In any event, shredded municipal waste and household garbage coming into hopper 22 is mixed thereat with an incoming water stream and proceeds downwardly into the inner revolving shell 22 such that the auger portion at 39 thereof may aid in gradually propelling the incoming shredded municipal waste and garbage into the pulping plate area of the revolving shell 22. These plates will pulp the organic material such as foodstuff and paper products, so that the same will rise as pulp to the fluid level and become suspended material therein. The remaining materials, such as rock, sand, glass, non-ferrous metals, and other non-floatables will descend to the bottom of the revolving shell and yet will be carried thereby through the spaces between the pulping plates into the tank portion 43 proximate the lower end of the auger 44. The pulped material and floatables proximate the water level L maintained in the equipment will be carried by the rake structure, 62 and 63, to the discharge opening 62A over the base or lip 62' thereof.

Should an imbalance occur in the nature of an excess of pulp material relative to the water present in the system and the water stream flowing out, then gate valve 30 may be opened such that water and pulp mixture may be carried by pipe T and trough P through the same ultimate deposit point as that supplied by trough 77' in FIG. 3. Subsequently, the gate valve will be closed and additional fresh water will be introduced into the system so as to lower the effective density of pulp material within the water and hence re-establish the proper balance. Accordingly, all of the pulp material may be discharged from the tank, either through the primary discharge opening 62A or, in the case of imbalance, through the gate valve 30.

The auger 44, again, carries the non-floatables upwardly along the trough 45 of tank portion 43 so the same may drop into hopper 72 and thus be deposited on endless conveyor 78. Again, and as was before explained, the vibrating screen or grate at 76 effects a separation of pulp and water at this point from rubber, wood, plastics and other materials that proceed downwardly over the vibrating screen onto endless conveyor 78.

It is most important to note that the final separation proximate endless conveyor 78' effects a selection of materials that are wholly combustible, namely plastics, wood and rubber. Accordingly, the output carried by conveyor 78' may be readily incinerated. The pulp and water carried by trough 77 may be routed directly to a sewer treatment plant for final and conventional sewage type disposal. The material carried by auger 44 may be routed by endless conveyor 78 for further processing or disposal. If disposal is intended, it is noted that the same is inert and hence will not contaminate the soil in which the same is deposited.

Arcuate filler plate F may be fixedly positioned within the outer cylinder 21 proximate the upper portion of revolving inner cylinder 22 to keep waste debris from entering the space between the cylinders.

While particular embodiments of the invention have been shown and described, it will be obvious to those skilled in the art the various changes and modifications which may be made without departing from the essential features of the present invention and, therefore, the aim in the appended claims is to cover all such changes and modifications as fall within the true spirit and scope of the invention.

I claim:

1. Hydropulper and classifying equipment including, in combination: an outer cylinder having a feed hopper, an inner cylinder revolvably mounted within said outer cylinder and communicating with said hopper, said inner cylinder including interior pulping projections, means for rotating said inner cylinder coupled thereto, a tank integral with said outer cylinder, said tank including an inclined trough, an auger journaled for disposition within said trough and extending in an upper end upwardly therefrom, means for rotating said auger coupled thereto, conveyor means disposed beneath said upper end of said auger for receiving contents expelled thereat, revolvable rake means essentially horizontally disposed within said tank, said tank having a side discharge opening proximate the travel path of said rake means, a water-pulp receiving trough operatively disposed proximate said discharge opening, vibrating screen means positioned above said water-pulp receiving trough and proximate said discharge opening, and conveyor means disposed at a lower level than and proximate said vibrating screen means for receiving materials vibrated thereover.

2. The equipment of claim 1 wherein said tank includes a drain, and valve means for selectively opening said drain coupled thereto.

3. The equipment of claim 1 wherein said inner cylinder includes a central shaft journalled at opposite ends, and auger means disposed upon said shaft and positioned below, proximate, and in communication with said hopper means.

4. The equipment of claim 1 wherein said rake means is inclined for scooping upwardly in the direction of rake travel, and means cooperable with said rake means for elevating said rake means when the latter advances at its respective extremity toward said discharge opening.

5. The equipment of claim 1 wherein said equipment includes motor means for revolving said rake means and having a shaft, said rake means comprising a pair of rakes pivoted about respective, offset transverse axes to said shaft, and a cam plate fixedly disposed within said tank and having a cam rise disposed proximate said discharge opening and engagable by said rakes, for lifting the latter as the same respectively approach said discharge opening.

6. The equipment of claim 1 wherein said tank has an arcuate partition defining a travel path lateral extremity for said rake means, said inclined auger passing underneath said partition.

7. The equipment of claim 6 wherein said rake means include resilient, wiper ends.

8. Hydropulper and classifying equipment including, in combination, means for receiving non-sewage waste materials, including pulpable products, and for pulping the same in an aqueous environment; rake means, centrally revolvable about a vertical axis, for routing pulped materials into receiving structure; means for advancing heavier-than-water materials gradually upwardly, underneath said routing means, to a discharge end; fixed, horizontally arcuate, vertical partition means supported above and depending into said receiving means, above said advancing means and between said routing means and said discharge end, and positioned proximate said rake means along its revolvement path, for preventing so-pulped products from flowing horizontally toward and into said advancing means.

9. Hydropulper and classifying equipment including, in combination: an outer cylinder having a feed hopper, an inner cylinder revolvably mounted within said outer cylinder and communicating with said hopper, said inner cylinder including interior pulping projections, means for rotating said inner cylinder coupled thereto, a tank integral with said outer cylinder, said tank including an inclined trough, an auger journaled for disposition within said trough and extending in an upper end upwardly therefrom, means for rotating said auger coupled thereto, conveyor means disposed beneath said upper end of said auger for receiving contents expelled thereat, revolvable rake means cooperatively disposed within said tank, said tank having a side discharge opening proximate the travel path of said rake means, a water-pulp receiving trough operatively disposed proximate said discharge opening, vibrating screen means positioned above said water-pulp receiving trough and proximate said discharge opening, and conveyor means disposed at a lower level than and proximate said vibrating screen means for receiving materials vibrated thereover.

* * * * *